(No Model.)

C. P. JOHNSON.
PIE PLATE LIFTER.

No. 564,285. Patented July 21, 1896.

Witnesses.

Inventor:
C. P. Johnson.
By Attorneys.

UNITED STATES PATENT OFFICE.

CHARLES P. JOHNSON, OF EUREKA, KANSAS, ASSIGNOR OF TWO-THIRDS TO ROBERT BRYDEN, OF SAME PLACE, AND J. D. MORLEY, OF EL DORADO, KANSAS.

PIE-PLATE LIFTER.

SPECIFICATION forming part of Letters Patent No. 564,285, dated July 21, 1896.

Application filed February 24, 1896. Serial No. 580,607. (No model.)

*To all whom it may concern:*

Be it known that I, CHARLES P. JOHNSON, of Eureka, Greenwood county, Kansas, have invented certain new and useful Improvements in Pie-Plate Lifters, of which the following is a full, clear, and exact description, reference being had to the accompanying drawings, forming a part thereof.

My invention relates to pie-plate lifters; and my object is to produce at small cost a simple and effective device for this purpose which at the same time is strong and durable of construction.

To this end the invention consists in certain novel and peculiar features of construction and arrangement, as will be hereinafter described and claimed.

In order that the invention may be fully understood, I will proceed to describe it with reference to the accompanying drawings, in which—

Figure 1:
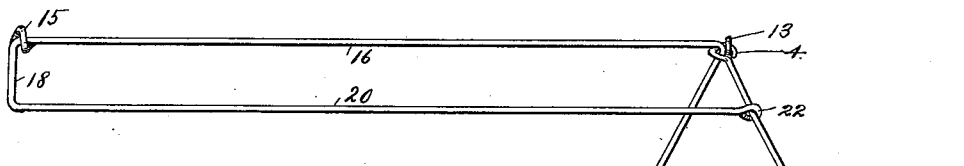
Figure 2:
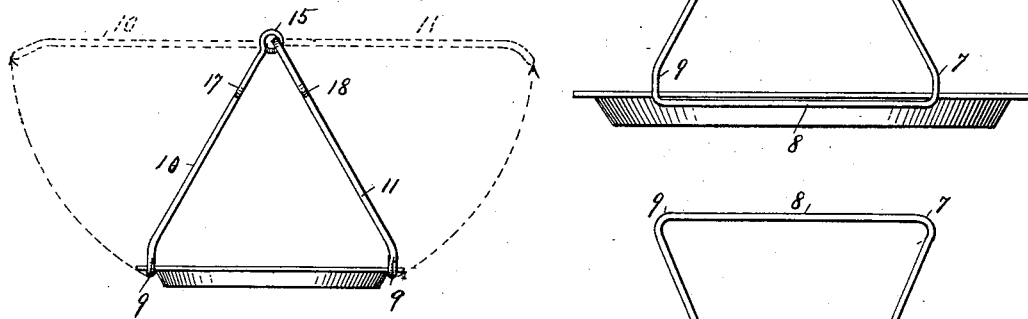
Figure 3:
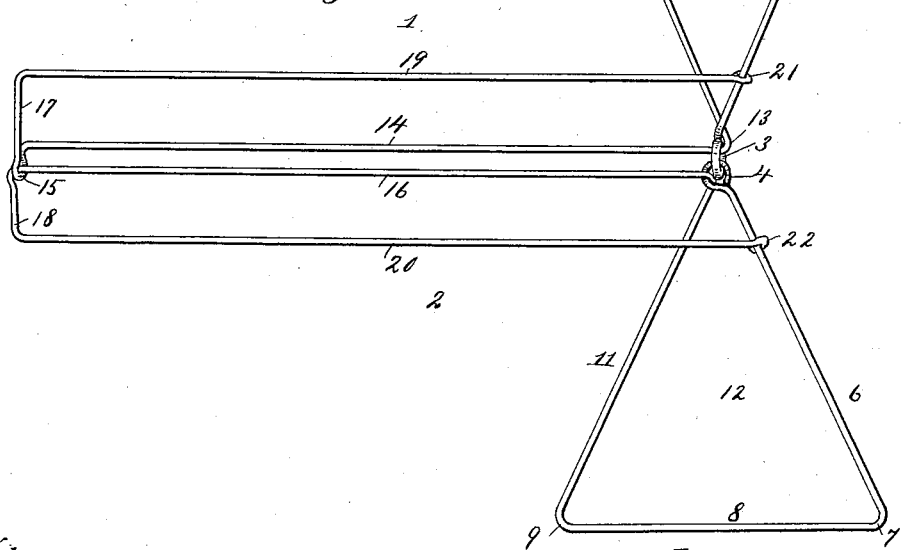

Figure 1 represents, in side elevation, a pie-plate lifter embodying my invention, and also illustrates the same in proper operative position relative to a pie-plate. Fig. 2 represents a rear end view of the device as engaging a pie-plate, and Fig. 3 represents a top plan view of the device when spread open or in its inoperative position.

In carrying out my invention, which comprises, essentially, two skeleton members hinged together, 1 and 2, I bend the ends of two stiff wires to form the interlocking eyes 3 and 4, one eye being arranged vertically and the other eye horizontally, so as to permit of the necessary hinge movement. The wires are then bent divergently outward, as shown at 5 and 6, for a suitable distance, and are then bent slightly downward, as shown at 7, and then extended rearwardly and parallel for a few inches, as shown at 8. They are then bent upwardly, as shown at 9, and are extended convergently inward at corresponding angles to the arms 5 and 6, so as to form in effect two triangles 12. The wire 10 crosses the wire 5 below, and is then bent upwardly, as shown at 13, and extended rearwardly through the loop or eye 3, as shown at 14. The arm 11 of the other member extends upwardly through the horizontal eye 4, and is then bent rearwardly and parallel to the arm 14, as shown at 16. At a convenient distance, say about ten inches, from the interlocking eyes 3 and 4, the arm 14 is bent to form the vertically-disposed circular eye 15, which projects toward the opposite member of the lifter, and through said eye extends loosely the arm 16 of said member, so as to form practically a loose hinge connection. Both arms are then bent outwardly, as shown at 17 and 18, respectively, for an inch or so, and are then extended forwardly and approximately parallel with the arms 14 and 16, as shown at 19 and 20, respectively. They extend over the arms 10 and 11, respectively, of the triangles referred to, and are bent tightly around and clamped upon the arms 5 and 6 of the same, thus producing a lifter composed entirely of two substantially rigid wire members, which are hinged together at their rear and front ends.

The manner of manipulating this device for gripping and handling pie-plates or other plates or pans corresponding or approximately corresponding in formation is as follows: Supposing that it be necessary to place a pie in or remove it from an oven, the handle of the device comprising the parallel portions 14, 16, 19, and 20 are grasped, and by means of the thumb and fingers the members 1 and 2 are spread horizontally. The device is then disposed above the pie-plate, and the triangular wings of the same are caused to descend until the parallel portions 8 thereof are at the outer sides of and below the flange of the plate. The device is then contracted or closed by causing said portions 8 to engage below the flange of the plate and against the body thereof by simply a closing movement of the hand, this gripping of the plate being performed reliably and easily by reason of the bends 7 and 9 at the outer ends of the arms 5 and 6, and 10 and 11, respectively, as will be clearly seen in the drawings. When the plate is so gripped it is conveyed from one place to another with ease and without any possible danger of becoming disengaged from the gripping-wings.

It is obvious, therefore, that this device will be found of great convenience in cooking or baking establishments, as it can be made in sizes to accommodate the different-sized plates or pans; and while I have described and illustrated a particular form of the device, it is to be understood that I may make slight changes in the form thereof, without departing from the spirit and scope or sacrificing any of the advantages of my invention.

Having thus described the invention, what I claim as new, and desire to secure by Letters Patent, is—

A pie-plate lifter, formed of wire and consisting of two sections, each bent to form triangles with their bases in a plane lower than their sides, one of them having one of its sides formed at its apex with a vertical eye, and the other at its apex having one of its sides formed with a horizontal eye, which is pivotally interlocked with said vertical eye; said triangles having their opposite sides extending through their respective eyes in a direction at right angles to said triangles for a suitable distance, and one of them bent to form a circular eye through which the other extends, and both of them bent outwardly and then forwardly again and parallel, and having their forward ends rigidly embracing the front sides of the triangles outward of their apices, substantially as shown and described.

In testimony whereof I affix my signature in presence of two witnesses.

CHARLES P. JOHNSON.

Witnesses:
T. C. WILLIAMS,
JOSEPH WELSH.